(12) United States Patent         (10) Patent No.:     US 9,423,033 B2
     Matsumura                    (45) Date of Patent:     Aug. 23, 2016

(54) DUST COVER

(71) Applicant: SUMITOMO RIKO COMPANY LIMITED, Komaki-shi, Aichi (JP)

(72) Inventor: Hiroyuki Matsumura, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/562,001

(22) Filed: Dec. 5, 2014

(65) Prior Publication Data

US 2015/0091257 A1  Apr. 2, 2015

Related U.S. Application Data

(63) Continuation of application No. PCT/JP2014/055336, filed on Mar. 3, 2014.

(30) Foreign Application Priority Data

Mar. 22, 2013  (JP) ................. 2013-059536

(51) Int. Cl.
    *F16D 65/00*   (2006.01)
    *F16J 15/52*   (2006.01)
    (Continued)

(52) U.S. Cl.
    CPC . *F16J 15/52* (2013.01); *F16F 9/38* (2013.01); *F16J 3/042* (2013.01); *F16J 3/043* (2013.01); *B29C 2049/4882* (2013.01); *B29L 2031/703* (2013.01)

(58) Field of Classification Search
    CPC ................. F16J 3/043; F16J 3/04; F16J 3/06; F16J 3/042; F16J 15/52; B29C 49/48; B29C 2049/5831; F16F 9/36
    See application file for complete search history.

(56) References Cited

U.S. PATENT DOCUMENTS 4,116,115 A * 9/1978 Gross et al. ................ 92/168
4,235,426 A * 11/1980 Sullivan et al. .............. 267/220
(Continued)

FOREIGN PATENT DOCUMENTS

JP    A-3-56736    3/1991
JP    A-7-63236    3/1995
(Continued)

OTHER PUBLICATIONS

International Search Report issued in PCT/JP2014/055336 mailed Jun. 3, 2014 (with translation).
(Continued)

*Primary Examiner* — Kristina Fulton
*Assistant Examiner* — Eugene G Byrd
(74) *Attorney, Agent, or Firm* — Oliff PLC

(57) ABSTRACT

A dust cover made of resin comprising a bellows tube portion and a mating tube portion provided to one axial side of the bellows tube portion. The mating tube portion includes: a circumferential groove that opens onto an inner peripheral surface of the mating tube portion and is configured to receive a catch claw that projects from a cylinder to an outer peripheral side to be inserted into the circumferential groove from an opening of the mating tube portion; and at least one bent portion that has a mountain-shaped cross section projecting to the outer peripheral side while opening to an inner peripheral side of the mating tube portion and extends in an axial direction so that the mating tube portion is substantially enlarged in diameter via elastic deformation of the bent portion to expand in a circumferential direction.

8 Claims, 5 Drawing Sheets

(51) Int. Cl.
*F16F 9/38* (2006.01)
*F16J 3/04* (2006.01)
*B29L 31/00* (2006.01)
*B29C 49/48* (2006.01)

(56) References Cited

U.S. PATENT DOCUMENTS

| | | | | |
|---|---|---|---|---|
| 4,629,641 | A | * | 12/1986 | Paullin .................. 428/36.9 |
| 4,873,100 | A | * | 10/1989 | Dirksing et al. ............. 426/111 |
| 4,969,542 | A | * | 11/1990 | Athmer et al. ........... 188/322.12 |
| 5,015,002 | A | * | 5/1991 | Goodman et al. ............ 277/636 |
| 5,402,868 | A | * | 4/1995 | Handke et al. .......... 188/322.12 |
| 5,655,778 | A | * | 8/1997 | Cavanaugh ................ 277/315 |
| 5,954,168 | A | * | 9/1999 | Nakatani et al. ......... 188/322.12 |
| 8,657,270 | B2 | * | 2/2014 | Takada et al. ............... 267/221 |
| 2005/0242542 | A1 | * | 11/2005 | Handke et al. ......... 280/124.155 |
| 2006/0012089 | A1 | | 1/2006 | Beck |
| 2006/0107615 | A1 | * | 5/2006 | Ohshita .................... 52/750 |
| 2007/0087847 | A1 | * | 4/2007 | Patrascu et al. ............... 464/175 |
| 2008/0080927 | A1 | * | 4/2008 | Houis ............................ 403/23 |
| 2009/0145707 | A1 | * | 6/2009 | Henneberg et al. ...... 188/322.12 |
| 2012/0241267 | A1 | * | 9/2012 | Muraguchi ............. 188/322.12 |

FOREIGN PATENT DOCUMENTS

| | | |
|---|---|---|
| JP | A-11-125294 | 5/1999 |
| JP | A-2003-72338 | 3/2003 |
| JP | A-2007-32732 | 2/2007 |
| JP | A-2011-133080 | 7/2011 |

OTHER PUBLICATIONS

Aug. 6, 2015 Office Action issued in Chinese Patent Application No. 201480001839.5.
Oct. 1, 2015 International Preliminary Report on Patentability issued in International Application No. PCT/JP2014/055336.

* cited by examiner

DUST COVER

INCORPORATED BY REFERENCE

The disclosure of Japanese Patent Application No. 2013-059536 filed on Mar. 22, 2013 including the specification, drawings and abstract is incorporated herein by reference in its entirety. This is a Continuation of International Application No. PCT/JP2014/055336 filed on Mar. 3, 2014.

BACKGROUND OF THE INVENTION

1. Field of the Invention

The present invention relates generally to a dust cover adapted to cover a piston rod a shock absorber in a suspension mechanism, and more particularly, to a dust cover made of resin whose upper and lower ends are adapted to attach to the shock absorber.

2. Description of the Related Art

Conventionally, there is known a dust cover which is externally fitted and mounted onto a piston rod of a shock absorber so as to cover it in an automotive suspension mechanism. The dust cover includes a bellows tube portion having peaks and valleys arranged in a linked manner, and as shown in Japanese Unexamined Patent Publication No. JP-A-2003-072338, for example, is integrally formed with a spring seat by using a rubber elastic body and attached to the piston rod at the upper end.

Meanwhile, other than the structure in which the dust cover is attached to the piston rod only at the upper end as shown in JP-A-2003-072338, it would also be possible to employ a structure as shown in U.S. Pat. No. 5,954,168. Namely, the upper end of the dust cover is attached to the piston rod and the lower end thereof is attached to the cylinder in order to prevent entry of foreign matters from below. In U.S. Pat. No. 5,954,168, a catch claw that projects from the cylinder to the outer peripheral side is inserted into a circumferential groove that opens onto the inner peripheral surface at the lower end of the dust cover and detained thereto, whereby the lower end of the dust cover is attached to the cylinder.

Besides, in the case where both the upper and lower sides are attached to the shock absorber, since a tensile load in the axial direction can be input to the dust cover, there is a risk of insufficient durability when the dust cover is made of a rubber elastic body. In light of that, a dust cover made of resin as disclosed in Japanese Unexamined Patent Publication No. JP-A-2007-032732 or the like is under study as well.

However, in order to make it possible to readily insert the catch claw into the dust cover made of resin that has less elasticity than the one made of rubber, it is necessary to set the projecting dimension of the catch claw relatively small with respect to the aperture diameter of the lower end of the dust cover. This will cause the catch claw to easily fall out from the dust cover. On the other hand, in order to prevent falling out of the catch claw from the dust cover, it is necessary to set the projecting dimension of the catch claw sufficiently large with respect to the aperture diameter of the lower end of the dust cover. This will make it difficult to insert the catch claw into the lower end of the dust cover.

SUMMARY OF THE INVENTION

The present invention has been developed in view of the above-described matters as the background, and it is an object of the present invention to provide a dust cover with a novel structure which is able to allow the catch claw of the cylinder to be readily inserted into the dust cover as well as to prevent the inserted catch claw from becoming dislodged from the dust cover.

The above and/or optional objects of this invention may be attained according to at least one of the following modes of the invention. The following modes and/or elements employed in each mode of the invention may be adopted at any possible optional combinations.

A first mode of the present invention provides a dust cover comprising a bellows tube portion having peaks and valleys arranged in a linked manner, the bellows tube portion being configured to externally fit onto a piston rod of a shock absorber that constitutes a suspension mechanism, and a first axial side of the bellows tube portion being configured to attach to the piston rod while a second axial side thereof being configured to attach to a cylinder of the shock absorber, wherein a mating tube portion is provided to the second axial side of the bellows tube portion, and the mating tube portion includes: a circumferential groove that opens onto an inner peripheral surface of the mating tube portion and is configured to receive a catch claw that projects from the cylinder to an outer peripheral side to be inserted into the circumferential groove from an opening of the mating tube portion; and at least one bent portion that has a mountain-shaped cross section projecting to the outer peripheral side while opening to an inner peripheral side of the mating tube portion and extends in an axial direction so that the mating tube portion is substantially enlarged in diameter via elastic deformation of the bent portion to expand in a circumferential direction.

With the dust cover according to the above first mode, the dust cover made of resin, for which change in its circumferential length is limited, is able to realize substantial diameter enlargement of the mating tube portion through expanding deformation of the bent portion in the circumferential direction. Therefore, when inserting the catch claw that projects from the cylinder into the circumferential groove of the mating tube portion, insertion operation is made easy by the diameter enlargement of the mating tube portion. Moreover, since the bent portion undergoes elastic deformation to expand in the circumferential direction, after the completion of insertion of the catch claw into the circumferential groove, the expanding deformation of the bent portion will be eased or canceled. Accordingly, the catch claw is detained against the circumferential groove in the axial direction, so as to be prevented from becoming dislodged from the mating tube portion.

A second mode of the present invention provides the dust cover according to the first mode wherein the at least one bent portion comprises a plurality of the bent portions that are separated from one another in the circumferential direction of the mating tube portion.

According to the second mode, the plurality of bent portions each undergo expanding deformation in the circumferential direction. Thus, even if each bent portion is relatively small, the mating tube portion is able to greatly change its inside diameter, making it possible to readily insert the catch claw into the circumferential groove even with a small-diameter mating tube portion.

Note that by providing three or more bent portions along the circumference of the mating tube portion in a dispersed manner, the substantial diameter enlargement of the mating tube portion will be induced in a balanced manner along its circumference in accordance with the expanding deformation of each bent portion in the circumferential direction. This will avoid strain deformation of the mating tube portion, and the insertion of the catch claw into the circumferential groove can be performed more smoothly.

A third mode of the present invention provides the dust cover according to the second mode wherein each of the bent portions opens to the inner peripheral side with an approximately same aperture width.

According to the third mode, the catch claw inserted into the circumferential groove is prevented from entering a specific bent portion and becoming easily dislodged therefrom, so that the catch claw is detained against the circumferential groove in the axial direction about the entire circumference. Thus, the axial one end of the dust cover is stably retained by the cylinder.

A fourth mode of the present invention provides the dust cover according to the third or second mode wherein the bent portions comprise a main deforming portion that has a large projecting dimension to the outer peripheral side and an auxiliary deforming portion that has a small projecting dimension to the outer peripheral side.

According to the fourth mode, the diameter enlargement of the mating tube portion is induced primarily by expanding deformation of the main deforming portion in the circumferential direction. In addition, owing to expanding deformation of the auxiliary deforming portion in the circumferential direction, the mating tube portion undergoes diameter enlargement in an auxiliary manner, so that the main deforming portion can be made difficult to deform. Accordingly, during insertion of the catch claw it is possible to make the insertion sufficiently easy owing to the diameter enlargement, while after the insertion, dislodgment of the catch claw from the circumferential groove can be avoided. In particular, by arranging the main deforming portion to readily undergo elastic deformation to expand in the circumferential direction with a small force as well as arranging the auxiliary deforming portion to undergo elastic deformation to expand in the circumferential direction with a larger force than that required by the main deforming portion, it is possible to readily insert the catch claw into the circumferential groove as well as to advantageously prevent the catch claw from becoming dislodged after the insertion into the circumferential groove.

It would also be acceptable that, by setting a small angle to the projecting distal end of the main deforming portion (which has a larger projecting dimension) as well as setting a large angle to the projecting distal end of the auxiliary deforming portion (which has a smaller projecting dimension), the aperture widths of the main and auxiliary deforming portions to the inner peripheral side are made approximately equal.

A fifth mode of the present invention provides the dust cover according to any one of the first through fourth modes wherein the bent portion is connected to the bellows tube portion with the bent portion extending in the axial direction from a sloping surface of an axial end of the bellows tube portion.

According to the fifth mode, the bent portion also functions as a rib that reinforces the connecting section between the bellows tube portion and the mating tube portion. This will prevent strain deformation such as the mating tube portion entering the bellows tube portion during contraction of the dust cover, thereby achieving configuration stability.

A sixth mode of the present invention provides the dust cover according to any one of the first through fifth modes wherein the bent portion projects in a radial direction of the mating tube portion, and circumferentially opposite portions of the bent portion are of plane symmetrical shape to each other with a plane of symmetry extending in a direction of projection.

According to the sixth mode, the bent portion deforms to expand to the circumferentially opposite sides by the approximately same volume. Thus, diameter enlargement of the mating tube portion occurs in a balanced manner along the circumference without generating strain deformation.

A seventh mode of the present invention provides the dust cover according to any one of the first through sixth modes wherein the mating tube portion is made by blow molding using a plurality of split molds to be mutually parted in a radial direction, and an outer peripheral surface of each bent portion is formed with a slope angle such that any undercut is avoided in a direction of parting.

According to the seventh mode, even with the bent portion that projects to the outer peripheral side provided, the mating tube portion can be made by blow molding without causing any troubles such as difficulty in detaching the split molds due to the undercuts. Besides, through blow molding, the bent portion is made thinner toward its outer peripheral side. Accordingly, the bent portion can readily undergo elastic deformation to expand in the circumferential direction, making it easy to insert the catch claw into the circumferential groove.

An eighth mode of the present invention provides the dust cover according to any one of the first through seventh modes wherein the catch claw has tapered contours that gradually slope to the inner peripheral side toward its distal end in a direction of insertion into the opening of the mating tube portion.

According to the eighth mode, since the catch claw has tapered contours, when inserting the catch claw from the opening of the mating tube portion, it is easy to insert the catch claw into the circumferential groove owing to guiding action of the sloping outer peripheral surface of the catch claw. Meanwhile, after the catch claw is inserted into the circumferential groove, the distal end of the catch claw that positioned at the outer peripheral side is detained against the wall inner surface of the circumferential groove in the axial direction, so that the catch claw is prevented from becoming dislodged from the circumferential groove.

According to the present invention, the mating tube portion provided to the second axial side of the bellows tube portion includes the bent portion on its circumference, and expanding deformation of the bent portion induces substantial diameter enlargement of the mating tube portion. Therefore, with the dust cover made of resin, the catch claw projecting from the cylinder is easy to be inserted into the circumferential groove that opens onto the inner peripheral surface of the mating tube portion so that the dust cover can be attached to the cylinder. Moreover, since the bent portion elastically undergoes expanding deformation, after the catch claw is inserted into the circumferential groove, the expanding deformation of the bent portion is eased or canceled. Thus, the catch claw is prevented from becoming dislodged from the circumferential groove.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

An embodiment of the present invention will be described below in reference to the drawings.

Figure 1:
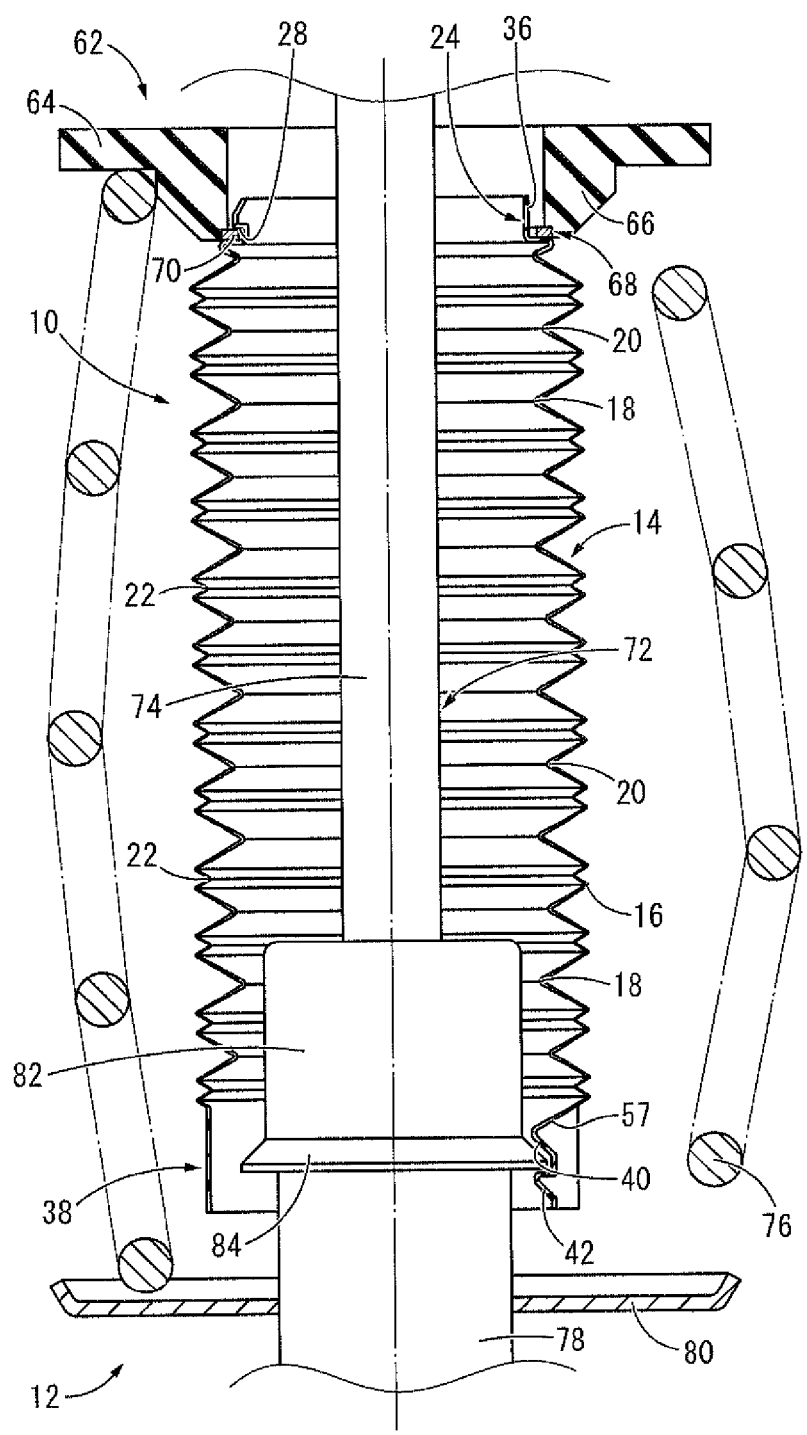
FIG. 1 is an elevational view in axial or vertical cross section showing a dust cover according to a first embodiment of the present invention under installation in a suspension mechanism.

Referring to FIG. 1, there is depicted a dust cover 10 according to a first embodiment of the present invention, in a state of being mounted onto an automotive suspension mechanism 12. In the description hereinbelow, as a general rule the vertical direction refers to the vertical direction in FIG. 1.

Figure 2:
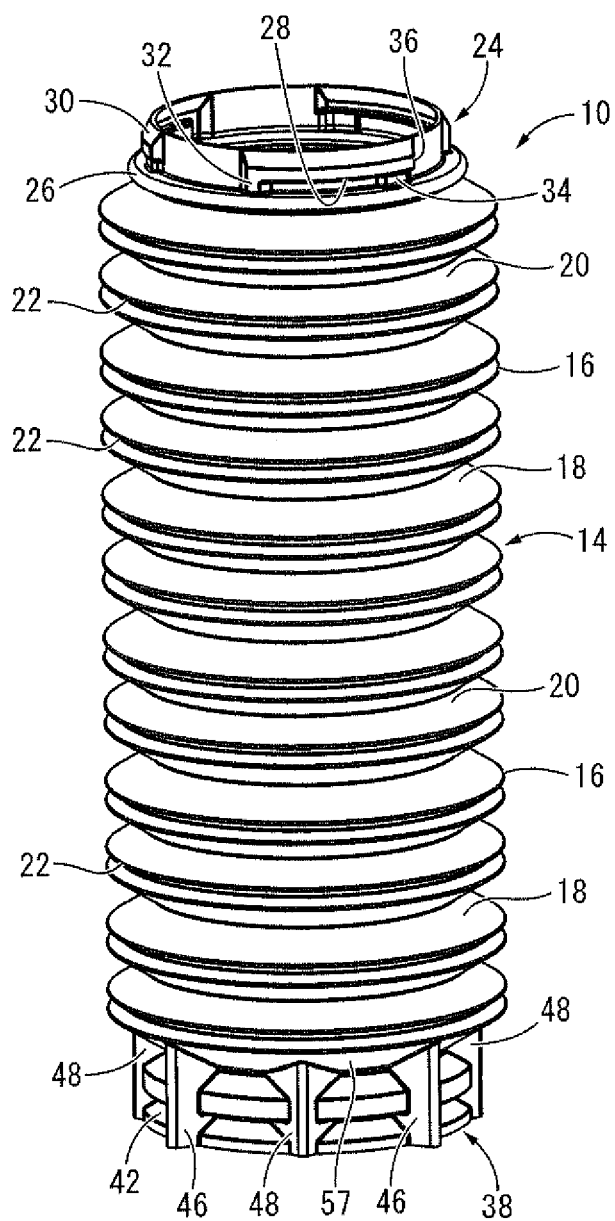
FIG. 2 is a perspective view of the dust cover of FIG. 1.
Figure 3:
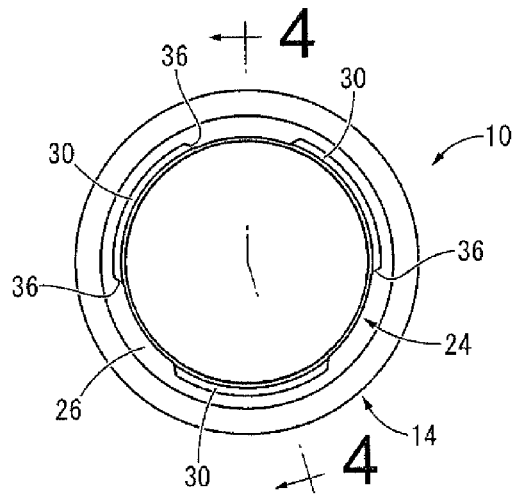
FIG. 3 is a top plane view of the dust cover shown in FIG. 2.
Figure 4:
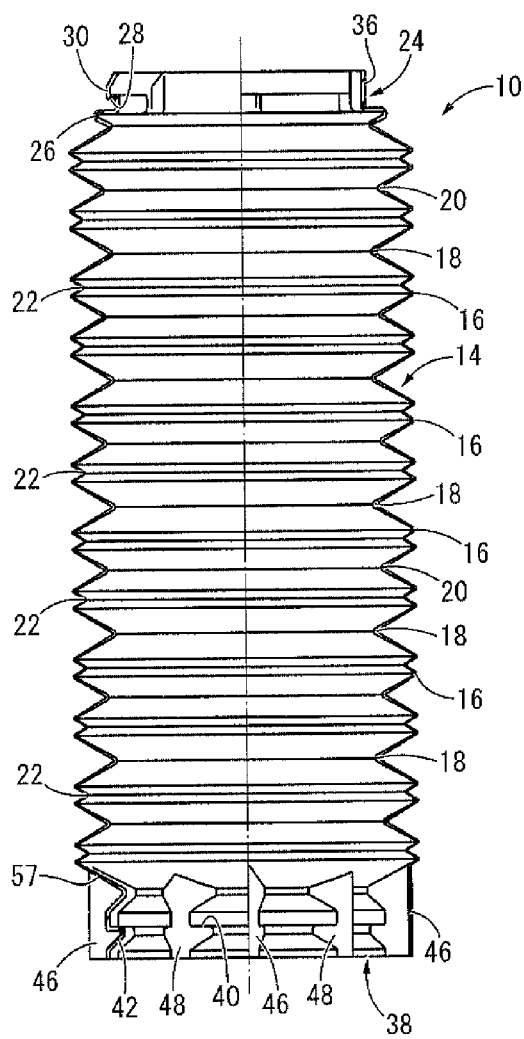
FIG. 4 is a cross sectional view taken along line 4-4 of FIG. 2.

Described more specifically, as depicted in FIGS. 2 through 4, the dust cover 10 overall has a thin-walled tubular shape, and is formed of synthetic resin. While no particular limitation is imposed as to the synthetic resin that forms the dust cover 10, in the present embodiment, for example, a material made from polypropylene (PP) serving as a thermoplastic resin mixed with ethylene-propylene rubber (EPDM) and dispersed is preferably employed, because of its excellent weatherability, formability or the like. However, in case of forming the dust cover 10 using a thermoplastic resin, it could also be possible to employ, for example, various thermoplastic elastomers including polyolefin-based resins such as polypropylene, polyethylene or the like, polyamide-based resins, polyvinyl chloride-based resins, polyester-based resins, urethane-based resins, styrene-based resins, olefin-based resins, or the like.

Besides, blow molding is preferably employed as a molding method of the dust cover 10, while injection molding is also employable. By employing the blow molding, the outer peripheral edge of a main deforming portion 46 and an auxiliary deforming portion 48 described later is made thinner, so as to readily deform to expand in the circumferential direction.

The dust cover 10 includes a bellows tube portion 14 in its axial medial section. The bellows tube portion 14 comprises a plurality of peaks 16 each have a convex shape that projects towards the outer periphery and continues around the entire circumference with a generally V-shaped cross section rotated laterally, and a plurality of valleys 18, 20 each have a concave shape that opens towards the outer periphery and continues around the entire circumference with a generally V-shaped cross section rotated laterally. The peaks 16 and the valleys 18, 20 are alternately arranged in a linked manner vertically in the axial direction. The valleys 18, 20 comprise large valleys 18 and intermediate valleys 20 each having a smaller depth dimension than the large valley 18, and the large valley 18 is formed on one side of the peak 16 while the intermediate valley 20 is formed on the other side of the peak 16. Accordingly, the large valleys 18 and the intermediate valleys 20 are alternately provided in the vertical direction, and the inner peripheral edges of the large valleys 18 and the inner peripheral edges of the intermediate valleys 20 are deviated in the radial direction.

Additionally, each peak 16 has at its outer peripheral edge a small valley 22 that opens to the outer peripheral side. The small valley 22 has a concave shape that opens towards the outer periphery and continues around the entire circumference with a generally V-shaped cross section rotated laterally, while being narrower as well as shallower than the large valley 18 and the intermediate valley 20.

The bellows tube portion 14 is capable of extension/contraction vertically in the axial direction due to change in angles at the outer peripheral edge of the peaks 16 and angles at the inner peripheral edge of the valleys 18, 20. Moreover, in the present embodiment, by providing the small valleys 22 at the outer peripheral portion of the peaks 16, the range of extension/contraction length allowed in the axial direction is more enlarged. In addition, the large valleys 18, the intermediate valleys 20, and the small valleys 22 are formed with mutually different depths so that the respective inner peripheral edges are deviated from one another in the radial direction. Thus, the inner peripheral edges of the valleys 18, 20, 22 are prevented from being overlapped with one another in the axial direction, realizing a small axial dimension of the bellows tube portion 14 in the maximum contraction state.

Meanwhile, the dust cover 10 includes an engaging tube portion 24 at axially above the bellows tube portion 14. The engaging tube portion 24 is of approximately cylindrical shape overall and has a flange portion 26 integrally formed with its lower end while projecting peripherally outward, which is linked to the upper edge of the bellows tube portion 14.

The engaging tube portion 24 further includes engaging grooves 28. The engaging grooves 28 are recessed grooves that open onto the outer peripheral surface while extending a prescribed length in the circumferential direction, and separately provided as separated engaging grooves independent of one another at three locations along the circumference of the engaging tube portion 24. The wall portion on the axially upper side of the engaging groove 28 is defined by an upper wall portion 30 that projects peripherally outward from the upper end of the engaging tube portion 24, while the wall portion on its axially lower side is defined by the flange portion 26.

In addition, each engaging groove 28 includes at its one circumferential end an abutting portion 32. The abutting portion 32 projects peripherally outward with the approximately same dimension as the upper wall portion 30, and extends vertically in the axial direction with its two axial ends connected to the upper wall portion 30 and the flange portion 26. With this arrangement, the engaging groove 28 has a deadend shape whose one circumferential end is surrounded by the upper wall portion 30, the flange portion 26, and the abutting portion 32.

Moreover, a surmountable projection 34 is formed within each engaging groove 28. The surmountable projection 34 is formed in proximity to the other circumferential end of the engaging groove 28 while projecting peripherally outward from its bottom wall portion, and extends vertically between the upper wall portion 30 and the flange portion 26. Besides, as shown in FIG. 2, the surmountable projection 34 has a projecting dimension to the outer peripheral side smaller than that of the abutting portion 32. Accordingly, the engaging groove 28 is partially made shallow at the formation part of the surmountable projection 34, but the other circumferential end of the engaging groove 28 is not blocked thereby and opens in the circumferential direction.

Furthermore, the opening of the other circumferential end of each engaging groove 28 communicates with an insertion groove 36. The insertion groove 36 opens onto the outer peripheral surface of the engaging tube portion 24 and extend upward from the other circumferential end of the engaging groove 28. In addition, the insertion groove 36 is formed circumferentially between the engaging grooves 28, 28 that are adjacent in the circumferential direction along the circumference of the engaging tube portion 24. Thus, each insertion groove 36 is formed partially along the circumference of the engaging tube portion 24.

Meanwhile, the dust cover 10 includes a mating tube portion 38 at one axial side (the lower side) of the bellows tube portion 14. The mating tube portion 38 is of approximately cylindrical shape and has a circumferential groove 40 at its axially medial section that opens onto the inner peripheral surface. The circumferential groove 40 includes an upper side wall that slopes downward towards the outer peripheral side and a lower side wall that extends in the approximately axis-perpendicular direction. Moreover, below the circumferential groove 40, provided is a tapered tube portion 42 whose diameter becomes progressively larger towards the bottom with its upper end connected to the opening edge of the lower side wall of the circumferential groove 40. Accordingly, the lower edge opening of the mating tube portion 38 defined by the tapered tube portion 42 is positioned further to the outer peripheral side than the inner peripheral opening edge of the circumferential groove 40.

Figure 5:
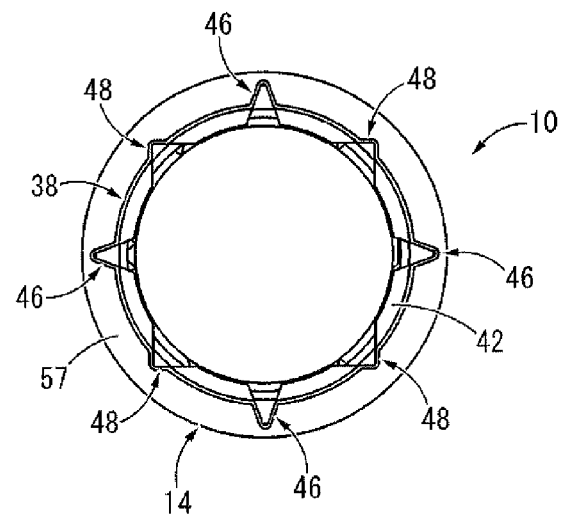
FIG. 5 is a bottom plane view of the dust cover shown in FIG. 2.

Additionally, as shown in FIG. 5, the mating tube portion 38 includes along its circumference a plurality of main deforming portions 46 and a plurality of auxiliary deforming portions 48 serving as bent portions. The main deforming portion 46 and the auxiliary deforming portion 48 both have a mountain-shaped cross section projecting to the outer peripheral side while opening to an inner peripheral side of the mating tube portion 38 and extends nearly straightly in the axial direction, so as to be separated from one another in the circumferential direction in a dispersed arrangement. In the present embodiment, four main deforming portions 46, 46, 46, 46 are arranged at approximately equal intervals, while each of the auxiliary deforming portions 48 is arranged at the circumferentially center between the main deforming portions 46, 46 that are arranged adjacent to each other in the circumferential direction. Note that when a plurality of bent portions are provided (namely, the main deforming portion 46 and the auxiliary deforming portion 48 in the present embodiment), it is desirable to arrange the bent portions throughout the area more than half the circumference in a circumferentially separated manner.

Figure 6:
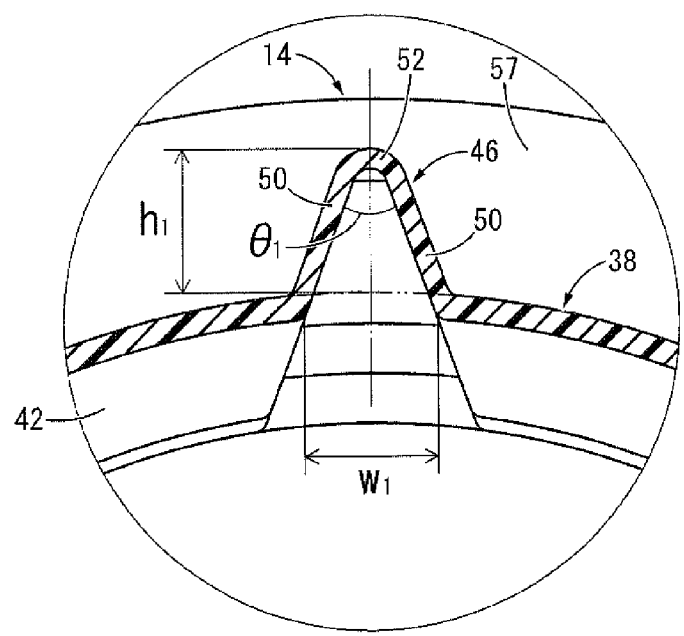
FIG. 6 is a fragmentary enlarged transverse cross sectional view of a principle part of the dust cover shown in FIG. 2.

The main deforming portions 46 are formed along the circumference of the mating tube portion 38 so as to project radially outward in the up and down directions as well as in the right and left directions in FIG. 5. As shown in FIG. 6, in the present embodiment, the main deforming portion 46 includes first sloping plates 50, 50 that are circumferentially opposite surfaces and slope with respect to the direction of projection of the main deforming portion 46. In addition, the circumferentially opposite first sloping plates 50, 50 slope relative to each other so as to gradually approach toward the outer peripheral side, and the relative slope angle of the first sloping plates 50, 50, in other words, the angle: $\theta_1$ of the projecting distal end of the main deforming portion 46 is made smaller than 90 degrees. Moreover, the first sloping plates 50, 50 are integrally connected to each other at their outer peripheral ends by a first distal end 52 that has an approximately arcuate transverse cross section which is convex to the outer peripheral side. The main deforming portion 46 constructed in the above manner is of approximately plane symmetrical shape with respect to a plane that extends in the direction of projection as well as in the axial direction (the dot-and-dash line in FIG. 6).

Figure 7:
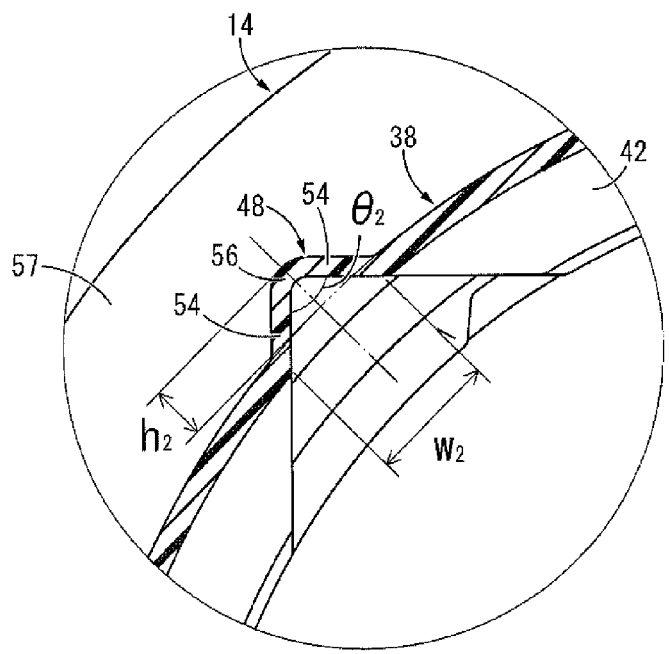
FIG. 7 is a fragmentary enlarged transverse cross sectional view of another principle part of the dust cover shown in FIG. 2.

Meanwhile, the auxiliary deforming portions 48 are, as shown in FIG. 5, formed so as to project radially outward at the circumferentially center between the main deforming portions 46, 46 that are adjacent to each other in the circumferential direction. As shown in FIG. 7, the auxiliary deforming portion 48 includes second sloping plates 54, 54 that are circumferentially opposite surfaces and slope with respect to the direction of projection of the auxiliary deforming portion 48. Like the first sloping plates 50, 50, the second sloping plates 54, 54 slope relative to each other so as to gradually approach toward the outer peripheral side, and the relative slope angle of the second sloping plates 54, 54, in other words, the angle: $\theta_2$ of the projecting distal end of the auxiliary deforming portion 48 is set at least 90 degrees but less than 180 degrees. Moreover, the second sloping plates 54, 54 are integrally connected to each other at their outer peripheral ends by a second distal end 56 that has an approximately arcuate transverse cross section which is convex to the outer peripheral side. The auxiliary deforming portion 48 constructed in the above manner is of approximately plane symmetrical shape with respect to a plane that extends in the direction of projection as well as in the axial direction (the dot-and-dash line in FIG. 7).

Furthermore, the main deforming portion 46 has the projecting dimension: $h_1$ to the outer peripheral side which is larger than the projecting dimension: $h_2$ of the auxiliary deforming portion 48 to the outer peripheral side. In preferred practice, the dimensions $\theta_1$, $\theta_2$, $h_1$, $h_2$ are established such that, by making the angle: $\theta_1$ of the projecting distal end of the main deforming portion 46 smaller than the angle: $\theta_2$ of the projecting distal end of the auxiliary deforming portion 48, the main deforming portion 46 and the auxiliary deforming portion 48 open to the inner peripheral side with the respective aperture widths: $w_1$ and $w_2$ that are approximately the same.

Then, due to elastic deformation of the main deforming portion 46 and the auxiliary deforming portion 48 to expand in the circumferential direction, the inside diameter dimension of the small-diameter portion of the mating tube portion 38 that is circumferentially off the main deforming portion 46 and the auxiliary deforming portion 48 becomes larger so that the mating tube portion 38 is substantially enlarged in diameter. In particular, with the main deforming portion 46 whose projecting dimension to the outer peripheral side is set large, the circumferential dimension of the inner peripheral side opening is allowed to change more greatly than that of the auxiliary deforming portion 48 via expanding deformation in the circumferential direction. Therefore, the substantial diameter enlargement of the mating tube portion 38 is realized primarily by deformation of the main deforming portion 46. Furthermore, since the auxiliary deforming portion 48 also undergoes expanding deformation in the circumferential direction, the mating tube portion 38 is enlarged in diameter in an auxiliary manner. Thus, substantial change in diameter of the mating tube portion 38 is more greatly allowed.

Also, as shown in FIG. 2, the main deforming portion 46 and the auxiliary deforming portion 48 both extend axially downward from a sloping surface 57 of the axially lower end of the bellows tube portion 14 so that their upper ends are connected to the bellows tube portion 14. With this arrangement, deformation at the connecting section between the bellows tube portion 14 and the mating tube portion 38 will be limited by the main deforming portion 46 and the auxiliary deforming portion 48 functioning as reinforcing ribs, thereby preventing strain deformation and the attendant deterioration in durability of the dust cover 10.

Figure 8:
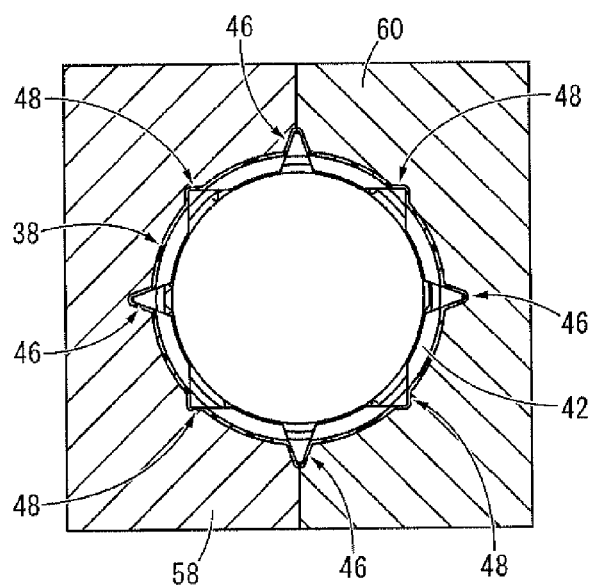
FIG. 8 is a transverse cross sectional view suitable for explaining a state of molding the dust cover shown in FIG. 2.

Meanwhile, the dust cover 10 is formed by blow molding using the left and right split molds 58, 60. The main deforming portion 46 and the auxiliary deforming portion 48 are formed so as to face to a specific direction and have a specific shape with respect to the direction of parting of the split molds 58, 60 used for molding the mating tube portion 38. In the description hereinbelow, as shown in FIG. 8, the direction of parting of the split molds 58, 60 refers to the left-right direction.

Specifically, the four main deforming portions 46, 46, 46, 46 whose distal angle is an acute angle become narrower in the circumferential direction toward their projecting distal end and are formed so as to be parallel or orthogonal to the direction of parting of the split molds 58, 60. Therefore, outer peripheral surface of each of the main deforming portions 46, 46, 46, 46 is entirely formed with a slope angle such that any undercut is avoided in the direction of parting of the split molds 58, 60.

On the other hand, the four auxiliary deforming portions 48, 48, 48, 48 whose distal angle is a right angle or an obtuse angle project so as to slope with respect to the direction of parting of the split molds 58, 60. In the present embodiment, the size of the distal angle: $\theta_2$ of each auxiliary deforming portion 48 is set to 90 degrees, and the direction of projection of the auxiliary deforming portion 48 coincides with the direction that slopes at ±45 degrees with respect to the direction of parting of the split molds 58, 60. By so doing, with each auxiliary deforming portion 48, one of the second sloping plates 54, 54 extends parallel to the direction of parting of the split molds 58, 60, while the other extends orthogonally to the direction of parting of the split molds 58, 60. Therefore, outer peripheral surface of each of the auxiliary deforming portions 48, 48, 48, 48 is entirely formed with a slope angle such that any undercut is avoided in the direction of parting of the split molds 58, 60.

In this way, the direction of projection of each main deforming portion 46 is positioned with respect to the direction of parting of the split molds 58, 60. Accordingly, the projecting dimension of the main deforming portion 46 is set large so that the substantial diameter enlargement of the mating tube portion 38 can be greatly obtained. In addition, the direction of projection of each auxiliary deforming portion 48 with respect to the direction of parting of the split molds 58, 60 as well as the size of the distal angle: $\theta_2$ of each auxiliary deforming portion 48 are appropriately set. Accordingly, it is possible to avoid any undercut for the auxiliary deforming portion 48 as well, thereby more greatly obtaining the substantial diameter enlargement of the mating tube portion 38.

As depicted in FIG. 1, the dust cover 10 constructed in the above manner is attached to an upper insulator 62 at its upper end. The upper insulator 62 is an annular member made of a rubber elastic body, and integrally includes a cylindrical portion 66 that projects downward from the inner peripheral edge of a spring supporter 64 of approximately annular disk shape. Moreover, the cylindrical portion 66 includes at its lower end a rigid annular constrained portion 68. The annular constrained portion 68 is integrally provided with a plurality of detaining projections 70 that project to the inner peripheral side at locations along the circumference.

With the detaining projections 70 of the upper insulator 62 circumferentially positioned with respect to the insertion grooves 36 of the dust cover 10, the engaging tube portion 24 of the dust cover 10 is fitted internally into the upper insulator 62 and the detaining projections 70 are inserted into the respective insertion grooves 36 in the axial direction. Then, the dust cover 10 is rotated in the circumferential direction relative to the upper insulator 62 so that the detaining projections 70 are inserted from the insertion grooves 36 into the engaging grooves 28, whereby the detaining projections 70 are detained against the engaging groove 28 in the axial direction. By so doing, the upper end of the dust cover 10 is attached to the inner peripheral side of the upper insulator 62 and supported thereby. Accordingly, a dust cover assembly according to the present embodiment is constituted.

The dust cover assembly is attached to an automotive suspension mechanism 12 as shown in FIG. 1. Specifically, the bellows tube portion 14 of the dust cover 10 is externally fitted around a piston rod 74 of a shock absorber 72 that constitutes the suspension mechanism 12, while the upper insulator 62 is overlapped with a spring seat fitting (not shown) adapted to attach to the piston rod 74. Besides, the upper end of a coil spring 76 that constitutes the suspension mechanism 12 is pressed against the spring supporter 64 of the upper insulator 62 from below. Accordingly, the upper end of the coil spring 76 is supported by the upper insulator 62, and the upper insulator 62 is pressed against the spring seat fitting by elasticity of the coil spring 76. Meanwhile, the lower end of the coil spring 76 is supported by a spring support fitting 80 fixed to a cylinder 78 of the shock absorber 72.

On the other hand, the lower end of the dust cover 10 is attached to the cylinder 78. Specifically, a cylinder cap 82 attached to the upper end of the cylinder 78 is provided with a catch claw 84 configured to be inserted into the circumferential groove 40 of the mating tube portion 38 of the dust cover 10. The catch claw 84 is integrally formed with the lower end opening of the cylinder cap 82, which has an inverted, approximately round tubular shape with a bottom, and projects to the outer peripheral side. In the present embodiment, the catch claw 84 has tapered cylindrical contours that gradually slope downward towards the outer peripheral side. Note that whereas the catch claw 84 is provided continuously about the entire circumference in the present embodiment, it would also be acceptable to provide the catch claw 84 partially along the circumference.

Then, the mating tube portion 38, which is the lower end of the dust cover 10, is externally fitted onto the cylinder 78 of the shock absorber 72 so that the catch claw 84 of the cylinder cap 82 is configured to be inserted into the circumferential groove 40 of the mating tube portion 38. By so doing, the catch claw 84 of the cylinder cap 82 is detained against the circumferential groove 40 of the mating tube portion 38 in the axial direction, whereby the lower end of the dust cover 10 is configured to attach to the cylinder 78. With this arrangement, the first axial side of the bellows tube portion 14 is configured to attach to the piston rod 74, while the second axial side thereof is configured to attach to the cylinder 78 that constitute the shock absorber 72. Note that the catch claw 84 is inserted into the circumferential groove 40 with a gap.

Here, the projecting distal end of the catch claw 84 projects further to the outer peripheral side than the inner peripheral opening edge of the circumferential groove 40, so that the catch claw 84 is configured to be inserted into the circumferential groove 40 by being guided by the sloping inner peripheral surface of the tapered tube portion 42 while pushing and broadening the mating tube portion 38. Specifically, when the catch claw 84 is inserted into the mating tube portion 38 from the lower opening of the tapered tube portion 42, the sloping outer peripheral surface of the catch claw 84 is pressed against the sloping inner peripheral surface of the tapered tube portion 42 at the portion that is off the main deforming portion 46 and the auxiliary deforming portion 48 on the circumference. Accordingly, during insertion of the catch claw 84 into the mating tube portion 38 in the axial direction, the small-diameter portion of the mating tube portion 38 that is circumferentially off the main deforming portion 46 and the auxiliary deforming portion 48 is subjected to radially outward force due to abutment by the catch claw 84. Consequently, the small-diameter portion of the mating tube portion 38 attempts to displace to the outer peripheral side due to the radially outward force exerted thereon.

However, since the dust cover 10 is made of synthetic resin, the mating tube portion 38 including the tapered tube portion 42 is less allowed to change its circumferential length compared to the case where the dust cover is made of rubber. This limits displacement of the small-diameter portion of the mating tube portion 38 to the outer peripheral side through the change in its circumferential length. Thus, according to the dust cover 10, the small-diameter portion of the mating tube portion 38 is allowed to displace to the outer peripheral side through the elastic deformation of each of the main deforming portions 46 and auxiliary deforming portions 48 provided on the circumference of the mating tube portion 38 to expand in the circumferential direction, in other words, enlargement of the distal angles: $\theta_1$, $\theta_2$ of the respective main deforming portions 46 and auxiliary deforming portions 48. Accordingly, the inside diameter dimension at the small-diameter portion of the mating tube portion 38 becomes larger without needing change in the circumferential length of the mating tube portion 38, thereby obtaining substantial diameter enlargement of the mating tube portion 38.

Owing to the substantial diameter enlargement of the mating tube portion 38 in this way, it is possible to readily insert the catch claw 84 into the mating tube portion 38, and though insertion of the catch claw 84 into the circumferential groove 40 of the mating tube portion 38, the lower end of the dust cover 10 is attached to the cylinder 78.

Moreover, after the catch claw 84 passes the inner circumference of the tapered tube portion 42 and is inserted into circumferential groove 40, the radially outward force exerted on the mating tube portion 38 will be canceled. Thus, the expanding deformation of the main deforming portion 46 and the auxiliary deforming portion 48 is canceled, and the mating tube portion 38 is substantially constricted in diameter to recover its original shape. As a result, the catch claw 84 is prevented from becoming dislodged in the downward direction, whereby the dust cover 10 is stably held attached to the cylinder 78.

Furthermore, the bent portion is constituted by the main deforming portion 46 and the auxiliary deforming portion 48 having different projecting dimensions to the outer peripheral side. Therefore, the main deforming portion 46 having larger projecting dimension readily undergoes expanding deformation, so that the diameter enlargement of the mating tube portion 38 is induced primarily by the main deforming portion 46. Besides, since deformation of the auxiliary deforming portion 48, which contributes to the diameter enlargement of the mating tube portion 38 in an auxiliary manner, is made relatively difficult, the catch claw 84 is prevented from becoming dislodged from the circumferential groove 40.

In the present embodiment, both the main deforming portions 46 and the auxiliary deforming portions 48 are provided in plurality and arranged in a dispersed manner at approximately regular intervals on the circumference of the mating tube portion 38. Therefore, diameter enlargement through expanding deformation in the circumferential direction is more efficiently realized, Additionally, in the present embodiment, the angle: $\theta_1$ of the projecting distal end of the main deforming portion 46 is made smaller than the angle: $\theta_2$ of the projecting distal end of the auxiliary deforming portion 48, while the aperture width: $w_1$ of the main deforming portion 46 to the inner peripheral side and the aperture width: $w_2$ of the auxiliary deforming portion 48 to the inner peripheral side are made approximately equal. With this arrangement, the catch claw 84 is prevented from entering a specific main deforming portion 46 or auxiliary deforming portion 48, and is detained against the circumferential groove 40 about the entire circumference. This prevents resistance to dislodgement of the catch claw 84 from the circumferential groove 40 in the axial direction from becoming small partially along the circumference, whereby dislodgment of the catch claw 84 from the circumferential groove 40 can be avoided.

Besides, the first sloping plates 50, 50 slope at the approximately same slope angle with respect to the direction of projection of the main deforming portion 46, and the main deforming portion 46 has a plane symmetrical shape with respect to a plane that extends in the direction of projection as well as in the axial direction. Therefore, when the main deforming portion 46 deforms to expand in the circumferential direction, it expands to the circumferentially opposite sides by the approximately same volume, so that the mating tube portion 38 enlarges its diameter in a balanced manner along the circumference. Note that in the present embodiment, the auxiliary deforming portion 48 also has a plane symmetrical shape with respect to a plane that extends in the direction of projection as well as in the axial direction, and is able to exhibit the same effect.

It should be appreciated that the catch claw 84 provided to the cylinder cap 82 has tapered contours that gradually slope to the inner peripheral side toward its distal end (upward) in the direction of insertion into the opening of the mating tube portion 38, so that the distal end of the catch claw 84 in the direction of insertion is made small in its diameter. Thus, during insertion of the catch claw 84 into the mating tube portion 38, the sloping outer peripheral surface of the catch claw 84 comes into abutment against the sloping inner peripheral surface of the tapered tube portion 42 so that the catch claw 84 is smoothly inserted without sticking or the like. Meanwhile, after the catch claw 84 is inserted into the circumferential groove 40, the distal end positioned at the outmost periphery is detained in abutment against the lower wall inner surface of the circumferential groove 40, so that the catch claw 84 is prevented from becoming dislodged in the downward direction from the circumferential groove 40.

In the present embodiment in particular, since the dust cover 10 is formed by blow molding, the main deforming portions 46, 46, 46, 46 and the auxiliary deforming portions 48, 48, 48, 48 that constitute the bent portion are made thinner especially at their projecting distal end, which is the outer peripheral edge thereof. Thus, the angles: $\theta_1$, $\theta_2$ of the respective main deforming portions 46 and auxiliary deforming portions 48 are configured to readily change.

An embodiment of the present invention has been described in detail above, but the present invention is not limited to those specific descriptions. For example, no particular limitation is imposed as to the shape, size or the like of the bent portion. As the transverse cross section of the bent portion, other than the V shape shown in the embodiment, it is possible to employ every shape that is convex to the outer peripheral side and is able to be detached from the split mold after molding such as a U shape, a semicircular shape, or the like, for example.

In addition, with regard to the number of the bent portion, whereas only a single bent portion could be acceptable, it is preferable to provide two or more bent portions, and more preferably, three or more bent portions are provided. The reason is that by providing a plurality of (especially three or more) bent portions, the expanding deformation of the bent portions allows the mating tube portion to efficiently enlarge its diameter without deforming in a strained shape. This makes it easy to insert the catch claw into the circumferential groove.

Moreover, in the case where the bent portions are provided in plurality, the bent portions are not limited to the configuration constituted by two types of bent portions, namely the main deforming portion 46 and the auxiliary deforming portion 48. The bent portions may be constituted by a plurality of bent portions having an identical shape, or may alternatively be constituted by three or more types of bent portions.

Furthermore, the direction of projection of the bent portion is not necessarily limited to the radial direction, but the bent portion may project to the outer peripheral side in the direction which deviates from the radial direction.

Besides, in the preceding embodiment, illustrated is the construction in which the main deforming portion 46 and the auxiliary deforming portion 48 that constitute the bent portion are both connected to the sloping surface 57 of the bellows tube portion 14 at their upper ends. However, the upper end of at least one of the main deforming portion 46 and the auxiliary deforming portion 48 may be separated downward from the sloping surface 57 of the bellows tube portion 14.

Also, the specific shape of the bellows tube portion is not limited to the one having the large valleys 18, the intermediate valleys 20, and the small valleys 22, but may be a general bellows configuration having peaks and valleys alternately arranged in a linked manner. Additionally, the specific shape of the engaging tube portion is not limited either. For example, it may be a simple tubular shape and secured to an attachment fitting of a bound stopper (not shown), a fitting of an upper mount (not shown), or the like.

What is claimed is:

1. A dust cover made of resin comprising a bellows tube portion having peaks and valleys arranged in a linked manner, the bellows tube portion being configured to externally fit onto a piston rod of a shock absorber that constitutes a suspension mechanism, and a first axial side of the bellows tube portion being configured to attach to the piston rod while a second axial side thereof being configured to attach to a cylinder of the shock absorber, wherein
a mating tube portion is provided to the second axial side of the bellows tube portion, and the mating tube portion includes:
a circumferential groove that opens onto an inner peripheral surface of the mating tube portion and is configured to receive a catch claw that projects from the cylinder to an outer peripheral side to be inserted into the circumferential groove from an opening of the mating tube portion; and
at least one bent portion that has a mountain-shaped cross section projecting to the outer peripheral side while opening to an inner peripheral side of the mating tube portion and extends in an axial direction so that the mating tube portion is substantially enlarged in diameter via elastic deformation of the bent portion to expand in a circumferential direction,
the at least one bent portion comprises a plurality of the bent portions that are separated from one another in the circumferential direction of the mating tube portion, and the circumferential groove extends between an interior peripheral surface of consecutive bent portions.

2. The dust cover according to claim 1, wherein each of the bent portions opens to the inner peripheral side with an approximately same aperture width.

3. The dust cover according to claim 1, wherein the bent portions comprise a main deforming portion that has a large projecting dimension to the outer peripheral side and an auxiliary deforming portion that has a small projecting dimension to the outer peripheral side.

4. The dust cover according to claim 1, wherein at least one of the plurality of bent portions is connected to the bellows tube portion with the at least one bent portion extending in the axial direction from a sloping surface of an axial end of the bellows tube portion.

5. The dust cover according to claim 1, wherein at least one of the plurality of bent portions projects in a radial direction of the mating tube portion, and circumferentially opposite portions of the at least one bent portion are of plane symmetrical shape to each other with a plane of symmetry extending in a direction of projection.

6. The dust cover according to claim 1, wherein the mating tube portion is made by blow molding using a plurality of split molds to be mutually parted in a radial direction, and an outer peripheral surface of each bent portion is formed with a slope angle such that any undercut is avoided in a direction of parting.

7. The dust cover according to claim 1, wherein the catch claw has tapered contours that gradually slope to the inner peripheral side toward its distal end in a direction of insertion into the opening of the mating tube portion.

8. The dust cover according to claim 1, wherein
the plurality of the bent portions comprise a plurality of main deforming portions each having a large projecting dimension to the outer peripheral side and a plurality of auxiliary deforming portions each having a small projecting dimension to the outer peripheral side, the main deforming portions and the auxiliary deforming portions being arranged in a dispersed manner at approximately regular intervals on a circumference of the mating tube portion, and
each of the main deforming portions and each of the auxiliary deforming portions open to the inner peripheral side with an approximately same aperture width.

* * * * *